United States Patent
Bi et al.

(10) Patent No.: US 11,322,964 B2
(45) Date of Patent: May 3, 2022

(54) AUTOMATIC CONTROL METHOD AND DEVICE FOR SOLAR SUPERCAPACITOR POWER SUPPLY

(71) Applicant: Shijie Bi, Beijing (CN)

(72) Inventors: Shijie Bi, Beijing (CN); Shengli Jian, Beijing (CN); Shibiao Fan, Beijing (CN)

(73) Assignee: Shijie Bi, Beijing (CN)

(*) Notice: Subject to any disclaimer, the term of this patent is extended or adjusted under 35 U.S.C. 154(b) by 0 days.

(21) Appl. No.: 17/237,311

(22) Filed: Apr. 22, 2021

(65) Prior Publication Data
US 2021/0344209 A1    Nov. 4, 2021

(30) Foreign Application Priority Data

Apr. 29, 2020    (CN) .......................... 202010354564.0

(51) Int. Cl.
*H02J 7/00* (2006.01)
*H02J 7/35* (2006.01)
*H02J 7/34* (2006.01)

(52) U.S. Cl.
CPC ........ *H02J 7/0068* (2013.01); *H02J 7/00302* (2020.01); *H02J 7/35* (2013.01); *H02J 7/345* (2013.01); *H02J 2207/50* (2020.01)

(58) Field of Classification Search
CPC ........ H02J 7/0068; H02J 7/00; H02J 7/00302; H02J 7/35; H02J 2207/50; H02J 7/345; H02J 7/34
See application file for complete search history.

(56) References Cited

FOREIGN PATENT DOCUMENTS

JP    2003229820 A    *    2/2002

* cited by examiner

*Primary Examiner* — Robert L Deberadinis
(74) *Attorney, Agent, or Firm* — Patterson Thuente IP

(57) ABSTRACT

An automatic control method and device for a solar supercapacitor power supply, including: obtaining a current state of a power supply device and a capacitor voltage of an energy storage element; if the capacitor voltage exceeds an initial discharge voltage in a pure charging state, the power supply device switches to a power supply state and begins to discharge; if the power supply device has been switched to the power supply state and the capacitor voltage is lower than the termination discharge voltage, the power supply device is switched to the pure charging state wherein, the initial discharge voltage is higher than the termination discharge voltage, and a charge and discharge with hysteresis effect is achieved. The method and device provided by the disclosure can achieve the charge and discharge with hysteresis effect of the power supply device.

9 Claims, 4 Drawing Sheets

AUTOMATIC CONTROL METHOD AND DEVICE FOR SOLAR SUPERCAPACITOR POWER SUPPLY

CROSS REFERENCE TO RELATED APPLICATION

This application claims the priority of Chinese Patent Application No. 202010354564.0, entitled "Automatic Control Method and Device for Solar Supercapacitor Power Supply" filed with the Chinese Patent Office on Apr. 29, 2020, which is incorporated herein by reference in its entirety.

TECHNICAL FIELD

The disclosure relates to a field of rechargeable power supplies, in particular to an automatic control method and device for a solar supercapacitor power supply.

BACKGROUND

Nowadays, with a large number of remote Internet of Things (IoT) devices being used online, many battery-based solutions arise because of power supply limitations. However, the batteries have limited capacities, and thus some products that consume slightly more power require large-capacity batteries or rechargeable batteries. Large-capacity batteries have large volumes. Rechargeable batteries are generally charged by solar panels, but have limited battery lives and total times of charge and discharge cycles; and a performance of the rechargeable battery degrades or even fails after multiple charging cycles. Compared with batteries, supercapacitors have far greater charge and discharge times due to different storage mechanisms. And supercapacitors have large supply currents, small capacitances, fast discharging speed, and a wide range of discharge voltages. The combination of solar energy and supercapacitors is suitable for unattended IoT scenarios requiring for a super long time power supply with large short-term power consumption and small total continuous power consumption.

Due to the natural instability of solar energy, a solar supercapacitor power supply may use up electricity and then be recharged. During the charging process, stored energy may increase very slowly. When solar power is used in some equipment that consume more power, such as MCUs or communication modules with a large working current, the power supply needs to have enough power to complete an effective start or effective operation. In this case, the use of solar power supply may cause such a situation that the solar energy is charged to a certain level that the charged equipment circuit is activated, but the power is used up too fast to complete an effective start (bootup) or a full effective working operation span of the main equipment. At some point, the unfinished operation of the equipment stops, the capacitor continues to be charged, and repeats the above cycle that the capacitor is charged to a certain level to activate the equipment, but not enough for a full bootup/operation, the activated equipment uses out the capacitor power and stops before an effective operation could be done and waits for a next activation, until the capacitor could be recharged to the certain level to start all over again. In this way, a system can never be restored, and the stored power is consumed during repeated bootup.

SUMMARY

A purpose of the disclosure is to provide an automatic control method and device for a solar supercapacitor power supply, so as to achieve an automatic control of a hysteresis charge and discharge of the solar power supply device.

In order to achieve the above purpose, the disclosure provides the following solutions:

An automatic control method for a solar supercapacitor power supply, specifically comprises:

obtaining a current state of a power supply device;

obtaining a capacitor voltage of an energy storage element;

in a case that the state of the power supply device is a pure charging state, if the capacitor voltage exceeds an initial discharge voltage, the power supply device switches to a power supply state and begins to discharge, such that an output port outputs a voltage; and if the capacitor voltage does not exceed the initial discharge voltage, the pure charging state is maintained and the power supply device continues to be charged, with a voltage of the output port being zero;

in a case that the state of the power supply device has been switched to the power supply state, if the capacitor voltage is not lower than a termination discharge voltage, the power supply device maintains the power supply state; and if the capacitor voltage is lower than the termination discharge voltage, the power supply device is switched to the pure charging state with the voltage of the output port dropping to zero.

A solar power supply device comprises a solar panel, a supercapacitor, and a charge and discharge managing module; wherein the solar panel is configured to generate a current for charging the supercapacitor;

the supercapacitor is configured to store power; when the power supply device is in a pure charging state, the supercapacitor stores the power generated by the solar panel, and the supercapacitor is not connected to an output port; when the power supply device is in a power supply state, the supercapacitor is connected to the output port to provide an original voltage for discharge, and able to be charged at the same time;

the charge and discharge managing module is connected to the solar panel and the supercapacitor, and the charge and discharge managing module is configured to achieve a capacitor charging supervision and controlling function, a state monitoring and controlling function and a discharge managing function, to manage two states comprising the pure charging state and the power supply state, and two power thresholds comprising the initial discharge voltage and the termination discharge voltage.

Optionally, the charge and discharge managing module is configured to switch on a first electronic switch and a second electronic switch in a front end and a back end of a power supply path respectively by detecting a voltage from a low threshold to a high threshold; the charge and discharge managing module is further configured to lock an electronic interlock after the second electronic switch with the high-threshold is switched on, to ensure that when the second electronic switch is switched on in the power supply path, even if a voltage of an input port drops below the high threshold for switching on the second electronic switch but still higher than the low threshold for switching on the first electronic switch, the first electronic switch and the second electronic switch are maintained switched on; when the voltage of the input port is lower than the low threshold, the charge and discharge managing module is further configured to switch off the first electronic switch and the second electronic switch at the same time to disconnect the power supply path; thereby during the voltage drop of the supercapacitor, when a voltage of the supercapacitor is lower than the high threshold, the first electronic switch and the second electronic switch will not be switched off; and when the voltage of the supercapacitor is lower than a low battery threshold, the first electronic switch and the second electronic switch are switched off together, to achieve staged switching and locking, thus a charge and discharge with hysteresis effect is achieved.

Optionally, the supercapacitor can be replaced with a rechargeable battery.

Optionally, the solar panel can be replaced with an environmental power supply, wherein the environmental power supply is a wind power supply, a temperature power supply, a vibration power supply, a sport power supply, a pressure power supply, an electromagnetic wave power supply, a water flow power supply or a human power supply.

Optionally, the solar power supply device further comprises a control logic circuit, configured to control the maximum voltage of the supercapacitor could be charged and prevent the supercapacitor from being overcharged.

Optionally, an output voltage of the output port decreases with a decrease of a remaining power of the supercapacitor, or is a stabilized voltage.

Optionally, the solar power supply device further comprises an integration port, formed by directly integrating the control logic circuit and the output port into a front end of a powered equipment; wherein the integration port is externally connected to the solar panel and the supercapacitor, to achieve a solution that a solar panel charging power supply, the energy storage element, and a control module are physically separated and a logic power supply module actually keeps unchanged.

Optionally, the solar power supply device further comprises a battery; when the power of the supercapacitor is lower than a low termination discharge voltage (amount), the supercapacitor is no longer discharged, the output port is converted to supply power by the battery or other power supplies, the supercapacitor turns into the pure charging state, and a powered equipment can still work, to ensure that a solar-charged supercapacitor is used by the power supplies first when there is sunlight, and the battery is started only when the supercapacitor has not been charged for a long time, to ensure that the equipment can work; when the power of the supercapacitor rises above an initial discharge threshold again, the battery is switched off from discharge, and the supercapacitor is started to discharge, entering a supercapacitor working state; in this way, a maximum utilization of the solar power supply device can be ensured, and the equipment can also be prevent from stopping working under extreme conditions.

According to the specific embodiments provided by the disclosure, the disclosure discloses the following technical effects:

The disclosure provides an automatic control method and device for a solar supercapacitor power supply, in which an automatic start and stop control of a solar power supply device is achieved by setting a charge and discharge managing module, thereby achieving an automatic charge and discharge of the solar power supply device with hysteresis effect, avoiding a problem that when an ordinary solar power supply device is charged and discharged at the same time and the discharging is faster than the charging, the system cannot start normally. In addition, an automatic coordination of the charge and discharge of the solar power supply device is achieved by the method and device, such that when the solar power supply device is fully charged, it will automatically discharge, instead of only charging but not discharging; and a degree of discharge is automatically controlled, the discharge can be stopped appropriately in advance avoiding a full discharge.

BRIEF DESCRIPTION OF THE DRAWINGS

In order to explain the embodiments of the disclosure or the technical solutions in the prior art more clearly, the drawings to be used in the embodiments will be briefly introduced below. Obviously, the drawings described below are only some embodiments of the disclosure. Other drawings can be obtained from these drawings for those ordinary skill in the art, without creative work.

Figure 1:
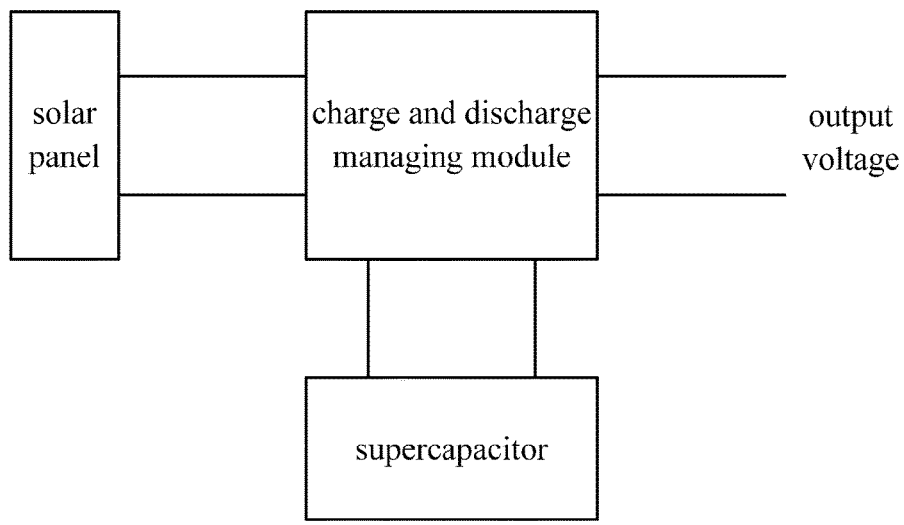
FIG. 1 is a schematic diagram showing a structure of the solar power supply device according to an embodiment of the disclosure.

Symbols in the drawings and their corresponding components are as follows:

1—solar panel, 2—voltage stabilizing circuit, 3—supercapacitor, 4—voltage sampling and control output circuit, 5—electronic interlock, 6—first electronic switch, 7—second electronic switch.

DETAILED DESCRIPTION OF THE EMBODIMENTS

The technical solutions in the embodiments of the disclosure will be clearly and completely described below in conjunction with the accompanying drawings in the embodiments of the disclosure. Obviously, the described embodiments are only a part of the embodiments of the disclosure, rather than all the embodiments. Based on the embodiments of the disclosure, all other embodiments obtained by those ordinary skill in the art without creative work shall fall within the protection scope of the disclosure.

The purpose of the disclosure is to provide an automatic control method and device for a solar supercapacitor power supply, so as to achieve the automatic control of the hysteresis charge and discharge of the solar power supply device.

In order to make the above-mentioned purposes, features and advantages of the disclosure more obvious and easy to understand, the disclosure will be further described in detail below in conjunction with the accompanying drawings and specific embodiments.

There is a corresponding relationship between the power and voltage of the supercapacitor in the solar power supply device. The greater the stored power of a capacitor, the higher the voltage of the capacitor. The voltage of the capacitor is used to indicate the stored power of the capacitor in the following description.

The solar power supply device includes a solar panel charging power supply, a charge and discharge managing module, an energy storage element and an output port. Wherein, the charge and discharge managing module is connected to the solar panel charging power supply and the energy storage element respectively, as shown in FIG. 1. In the pure charging state, the charge and discharge managing module is configured to control the solar panel charging power supply to charge the energy storage element, and to control the power supply device not to discharge. In the power supply state, the charge and discharge managing module is configured to control the energy storage element to discharge. The charge and discharge managing module includes a capacitor charging supervision and controlling unit, a state monitoring and controlling unit and a discharge managing unit. The capacitor charging supervision and controlling unit is configured to monitor the capacitor voltage of the energy storage element and manage whether the energy storage element is charged or not, to prevent the energy storage element from being overcharged. The state monitoring and controlling unit is configured to determine a state of the power supply device according to whether the output port is discharging or not currently, and to determine a state change of the power supply device according to the capacitor voltage of the energy storage element. The discharge managing unit is configured to control a starting and stopping of the discharge of the energy storage element according to the working state of the power supply device. When the state monitoring and controlling unit determines that the power supply device is in a pure charging state, the discharge managing unit prevents the energy storage element from discharging. The solar panel charges the energy storage element. The capacitor charging supervision and controlling unit is adapted to monitor the capacitor voltage of the energy storage element and ensure that the energy storage element is not overcharged. When the capacitor voltage is charged higher than an initial discharge voltage threshold, the state monitoring and controlling unit is configured to change the power supply device from the pure charging state to the power supply state, and the discharge managing unit controls the energy storage element to start discharging.

When the state monitoring and controlling unit determines that the power supply device is in the power supply state, the discharge managing unit controls the energy storage element to continuously discharge. The capacitor charging supervision and controlling unit monitors the capacitor voltage. When the capacitor voltage is lower than the termination discharge voltage threshold, the state monitoring and controlling unit changes the power supply device from the power supply state to the pure charging state, and the discharge managing unit controls the energy storage element to stop discharging. In the power supply state, the solar panel can continue to charge the energy storage element, and the capacitor charging supervision and controlling unit ensures that the energy storage element is not overcharged.

The two threshold voltages described above have the following relationship: the initial discharge voltage is higher than the termination discharge voltage.

First Embodiment

As shown in FIG. 1, the disclosure provides a solar power supply device, including a solar panel charging power supply, a charge and discharge managing module and an energy storage element, such as a supercapacitor. Wherein, the charge and discharge managing module is connected to the solar panel charging power supply and the energy storage element respectively. In the pure charging state, the charge and discharge managing module is configured to control the solar panel charging power supply to charge the energy storage element. In the power supply state, the charge and discharge managing module is configured to control the energy storage components to discharge. Wherein, the charge and discharge managing module includes a capacitor charging supervision and controlling unit, a state monitoring and controlling unit, and a discharge managing unit. Wherein, the capacitor charging supervision and controlling unit is configured to monitor the capacitor voltage of the energy storage element and prevent overcharging. The state monitoring and controlling unit determines a state of the power supply device according to whether the output port is discharged or not currently, and determines a state change of the power supply device according to the voltage of the energy storage element. The discharge managing unit is configured to control the energy storage element to start/stop discharging. Wherein, in the power supply state, the energy storage element can be charged or uncharged, depending on the usage setting.

In addition, the solar power supply device is also provided with a power output port. Wherein, the power output port is connected to the energy storage element via the discharge managing unit. The solar power supply device could also include a backup power supply. Wherein, the backup power supply is connected to the charge and discharge managing module.

The solar power supply device is configured to charge an external equipment to be powered via the power output port. The output voltage at the power output port can decrease with the remaining power of the supercapacitor but can also be a stabilized voltage, that is, the output voltage at the power output port is a variable voltage or a stabilized voltage.

Figure 3:
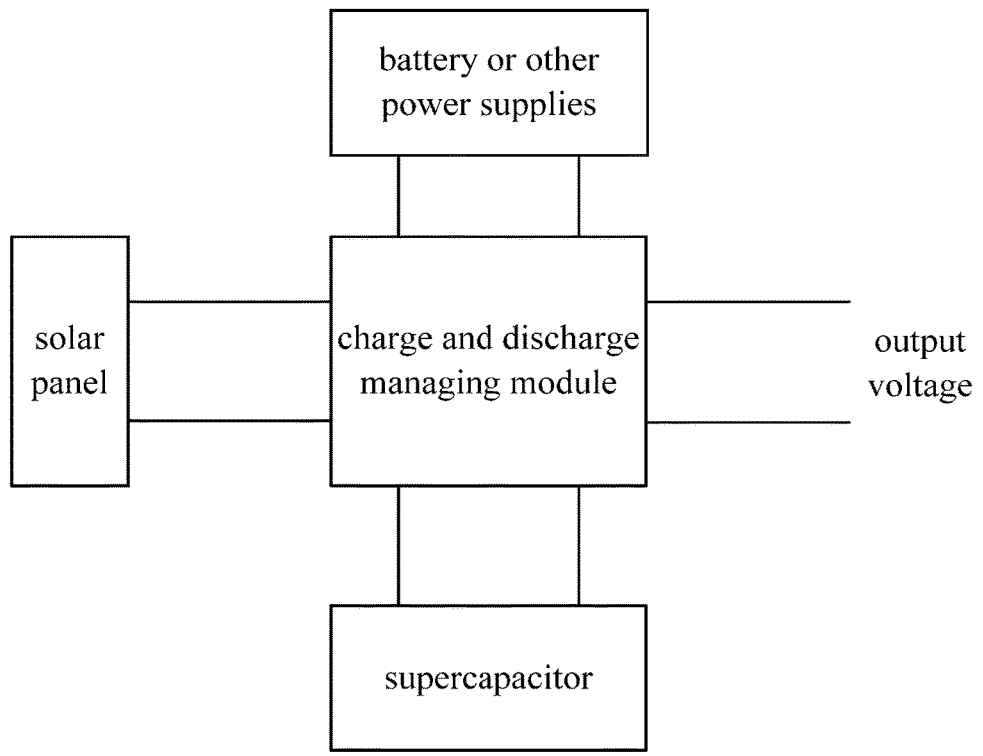
FIG. 3 is a schematic diagram showing a solar power supply device with a backup power supply according to an embodiment of the disclosure.

As shown in FIG. 3, as an optional implementation, the solar power supply device may further include a backup power supply connected to the discharge managing unit. Wherein, the backup power supply can be a battery or other power supplies. When the power of the supercapacitor is lower than the termination discharge voltage, the supercapacitor is no longer discharged, the output of the solar power supply device is converted to the battery or other power supplies, the supercapacitor is turned into a pure charging state, and the powered equipment can still work, ensuring that a solar-charged supercapacitor is used by the power supply device first when there is sunlight, and the battery is started only when the supercapacitor has not been charged for a long time, to ensure that the equipment can work. When the power of the supercapacitor rises above the initial discharge voltage again, the battery is switched off from discharge, and the supercapacitor is started to discharge, entering a state where the supercapacitor is charged and discharged at the same time. In this way, a maximum utilization of the solar power supply device can be ensured, and the powered equipment can also be prevented from stopping working under extreme conditions.

As an optional implementation, the solar panel charging power supply can be replaced with other environmental power supplies, such as a wind power supply, a temperature power supply, a vibration power supply, a sport power supply, a pressure power supply, an electromagnetic wave power supply, a water flow power supply or a human power supply.

Optionally, the solar power supply device further includes a voltage stabilizing module configured to regulate the output voltage to a stabilized voltage.

As an optional implementation, the energy storage element may also be a battery. The energy storage element is configured to store power and provide an original voltage for discharge.

The charge and discharge managing module is connected to the energy storage element and the solar panel respectively, achieving a capacitor charging supervision and controlling function, a state monitoring and controlling function and a discharge managing function. The charge and discharge managing module combines three functions and two thresholds, i.e. the initial discharge voltage and the termination discharge voltage, wherein the initial discharge voltage is higher than the termination discharge voltage. In this way, a conversion of the two states of the power supply device, i.e. the pure charging state and the power supply state, is implemented to achieve a charge and discharge logic with the hysteresis effect.

In an initial stage of the solar supercapacitor power supply, the state monitoring and controlling unit obtains the state of the power supply device according to an open and close state of the power output port.

Figure 2:
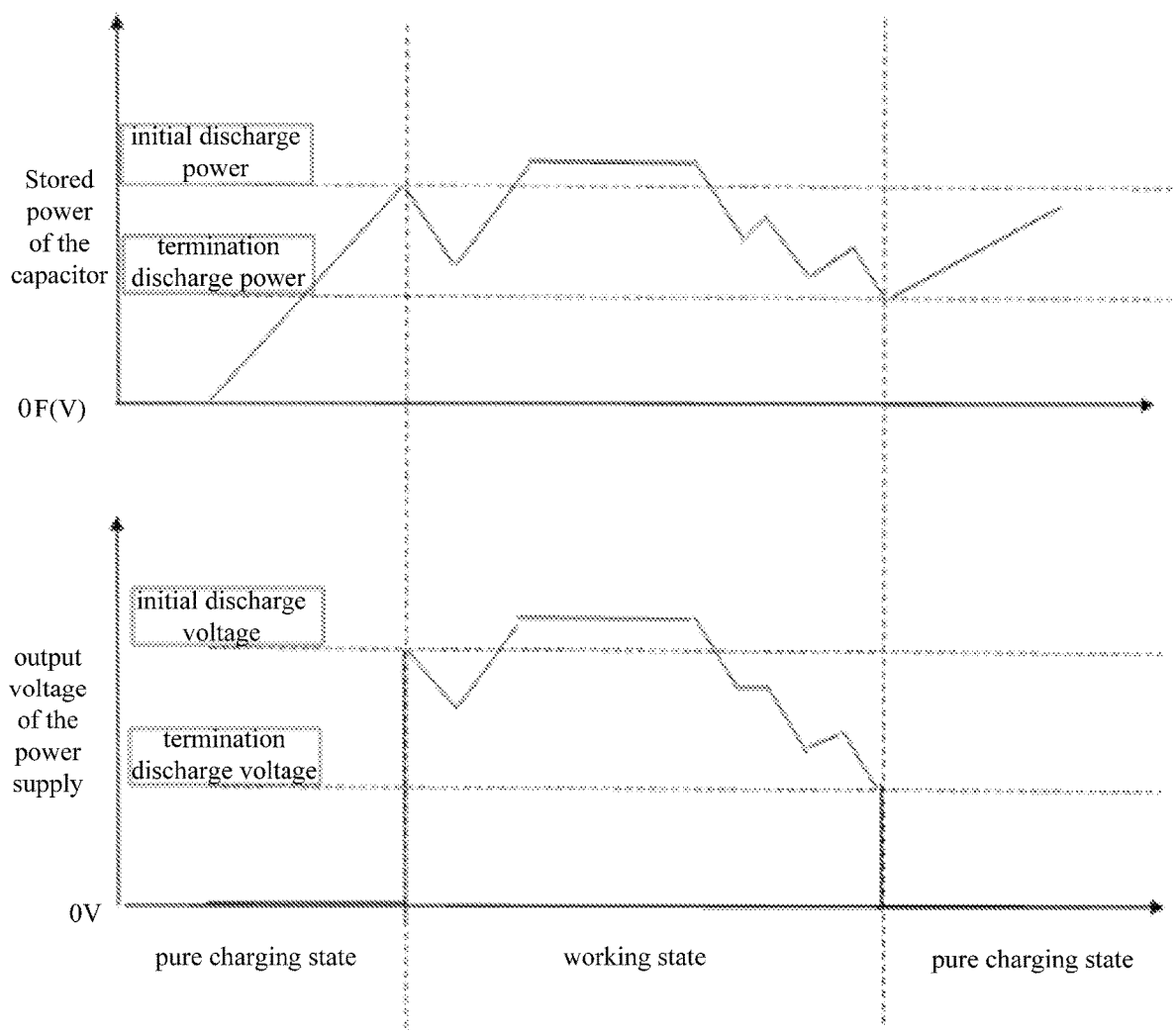
FIG. 2 is a schematic diagram showing a relationship between capacitor charging and power discharging of the solar power supply device according to an embodiment of the disclosure.

If the initial state of the solar supercapacitor power supply, i.e. the solar power supply device, is determined as the pure charging state, the capacitor charging supervision and controlling unit is configured to monitor the voltage of the supercapacitor. When the voltage of the supercapacitor does not reach the initial discharge voltage, the discharge managing unit is configured to control the power output port not to discharge, that is, the energy storage element and the power output port are not connected, resulting in the output voltage of the entire solar power supply device is zero. In a case that the supercapacitor is kept in the pure charging state, such as the pure charging state as shown on the left side of FIG. 2, the capacitor charging supervision and controlling unit is configured to ensure that the supercapacitor will not be overcharged. During the charging process, when the voltage of the supercapacitor monitored by the capacitor charging supervision and controlling unit exceeds the initial discharge voltage, the discharge managing unit connects the energy storage element and the power output port to activate the supercapacitor to discharge, such that the state monitoring and controlling unit controls the power supply device to switch to the power supply state. If a working power consumption is greater than a charge power, and the voltage of the supercapacitor monitored by the capacitor charging supervision and controlling unit gradually drops to a level lower than the termination discharge voltage, the state monitoring and controlling unit controls the power supply device to return to the pure charging state in which the supercapacitor may have residual power, as shown in the pure charging state on the right in FIG. 2, and the discharge managing unit terminates the discharge of the power supply device, such that the output voltage becomes zero to prevent meaningless consumption of the power of the supercapacitor. The supercapacitor can continue to be charged by the solar panel until the voltage of the supercapacitor reaches the initial discharge voltage again, and the pure charging state is switched to the power supply state. Wherein, the power of the supercapacitor is proportional to the voltage thereof. The greater the stored power, the higher the voltage. The unit of the stored power of the supercapacitor in FIG. 2 can be Farad (F) or Volt (V).

Figure 6:
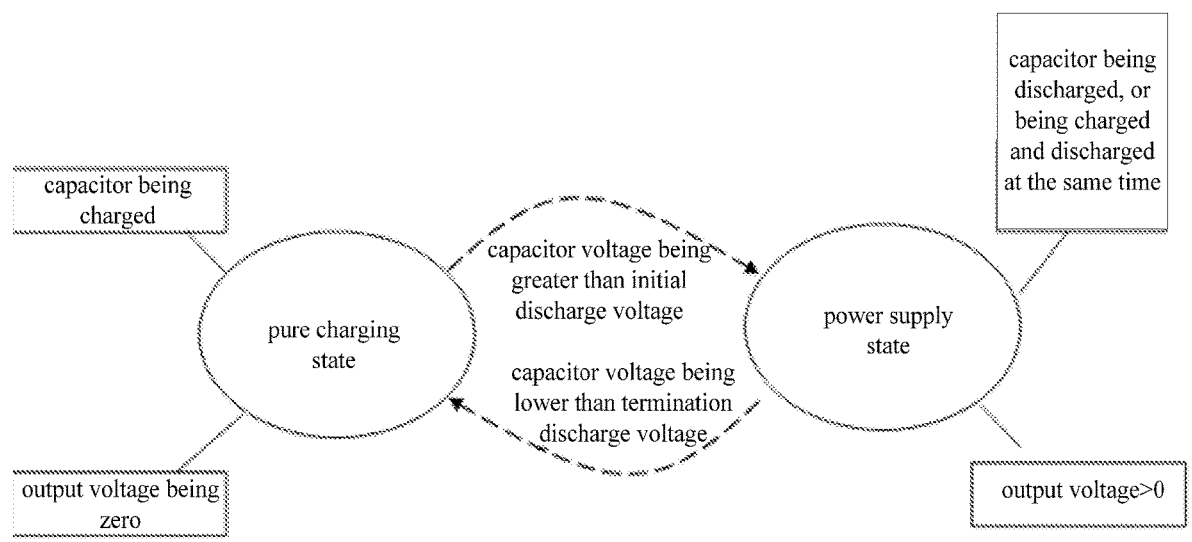
FIG. 6 is a schematic diagram showing the state of the solar power supply device according to an embodiment of the disclosure.

If the power supply device is in the power supply state, the discharge managing unit controls the power output port to discharge all the time, that is, the energy storage element is connected with the power output port. If there is sunlight, the charge and discharge managing module may control the supercapacitor to be charged at the same time as it is discharged, or control the supercapacitor not be charged during the discharge of the power output port, depending on an actual working scenario. If an operation of the powered equipment is completed, and the capacitor voltage is still above the termination discharge voltage, the solar panel continues to charge the supercapacitor, and the power output port remains in a discharged state, if the logic allows. In the power supply state, as long as the capacitor voltage is above the termination discharge voltage, even if the initial discharge voltage is not reached, the power output port can always output a voltage for the operation of the powered equipment. If a charged power of the supercapacitor is greater than the discharged power thereof, and the capacitor voltage gradually increases, the capacitor charging supervision and controlling unit ensures that the voltage of the supercapacitor will not be overcharged. As the capacitor voltage increases, the discharge voltage of the power supply device gradually increases until an allowed maximum charged power of the supercapacitor. The output can also be a stabilized voltage. If the charged power is less than the discharged power, and the capacitor voltage drops below the termination discharge voltage, such that the supercapacitor will stop discharging and the output voltage will drop to zero. The above whole process is shown as a power supply state at the middle in FIG. 2. The state diagram of the solar power supply device is shown in FIG. 6.

Figure 5:
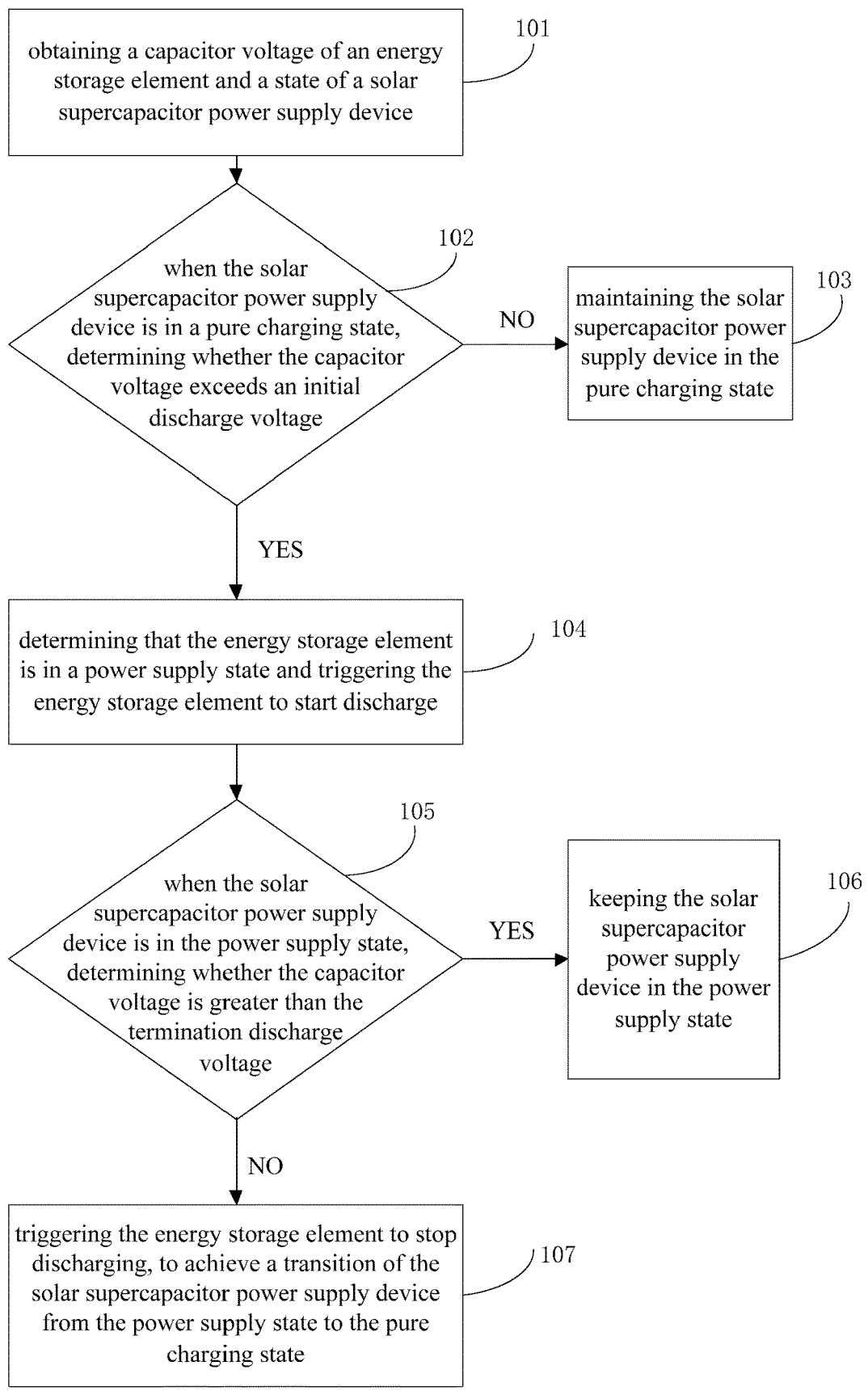
FIG. 5 is a flowchart showing the automatic control method for the solar supercapacitor power supply according to an embodiment of the disclosure.

The above process is summarized as an automatic control method for a solar supercapacitor power supply, as shown in FIG. 5, which specifically includes:

Step 101: obtaining a capacitor voltage of an energy storage element and a state of a solar power supply device;

Step 102: when the solar power supply device is in a pure charging state, determining whether the capacitor voltage exceeds an initial discharge voltage, to obtain a discharge judgment result; wherein, if the discharge judgment result indicates that the capacitor voltage does not exceed the initial discharge voltage, proceed to step 103; and if the discharge judgment result indicates that the capacitor voltage exceeds the initial discharge voltage, proceed to step 104;

Step 103: maintaining the solar power supply device in the pure charging state;

Step 104: determining that the energy storage element is in a power supply state and triggering the energy storage element to start discharge;

Step 105: when the solar power supply device is in the power supply state, determining whether the capacitor voltage is greater than the termination discharge voltage; wherein, if the capacitor voltage is greater than the termination discharge voltage, proceed to step 106; and if the capacitor voltage is less than or equal to the termination discharge voltage, proceed to step 107;

Step 106: keeping the solar power supply device in the power supply state; and

Step 107: triggering the energy storage element to stop discharging, to achieve the transition of the solar power supply device from the power supply state to the pure charging state.

The above working logic ensures that when the power of the supercapacitor is low, the power supply device will not output immediately to trigger the operation of the powered equipment, and can only continue to be charged. Only when the power reaches a higher level sufficient for the powered equipment to perform a complete operation, the power supply device will output a voltage. After the voltage output operation is completed, even if the capacitor voltage is lower than the initial discharge voltage, the solar power supply device still discharges as long as the capacitor voltage is still higher than the termination discharge voltage. At the same time, the supercapacitor can be charged to ensure the continuous operation of the powered equipment. If an amount of discharging of the supercapacitor continues to be greater than an amount of charging of the solar panel because the solar panel cannot charge the supercapacitor in time, and when the remaining power is not enough to support the equipment to complete effective work, the output is cut off in time, to ensure that the power supply device can be recharged to a higher level as soon as possible. The solar power supply device is suitable for a situation where the environmental power supply is unstable and the equipment works intermittently. Reasonable designs of a charging speed, charging and discharging thresholds, and a power consumption speed of the powered equipment can ensure that a capacity of the supercapacitor in the power supply state is always higher than the termination discharge voltage, and thus the powered equipment can work for a long time. Even if sometimes the power supply device cannot be charged for a long time to be powered off due to environmental factors, the power supply device will not be permanently powered off, since the power supply device can automatically start after the sun light is restored. Cooperating equipment can adopt a simple start-up mode that works immediately once being powered on, which is especially suitable for work scenarios of unattended IoTs.

In actual use, the control module can be set in the power supply part of a main equipment, to which the solar panel and the supercapacitor can be connected externally. External solar panels and supercapacitors and the control module in the equipment still constitute a solar charging power supply device with logically hysteresis charge and discharge managing function.

Second Embodiment

Figure 4:
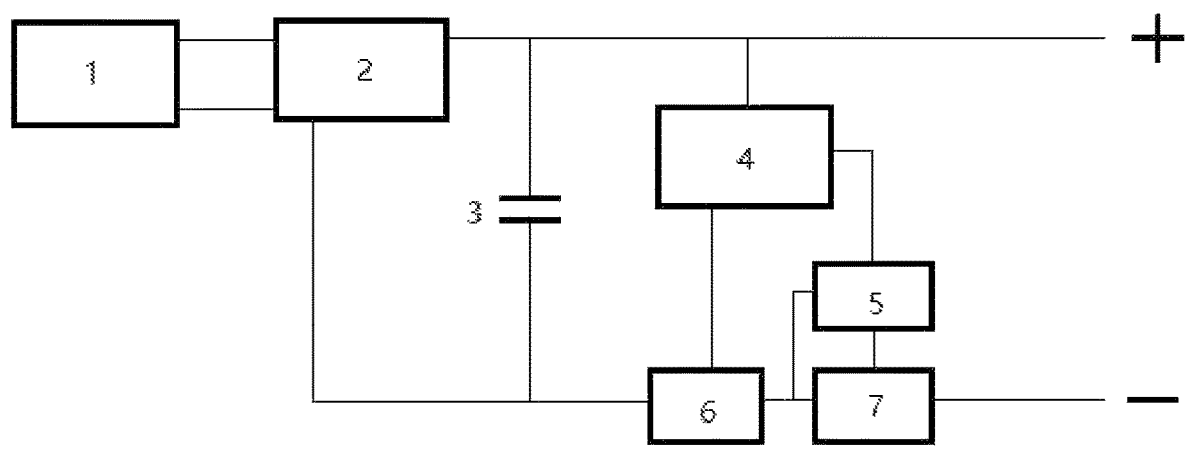
FIG. 4 is a circuit diagram of the solar power supply device according to an embodiment of the disclosure.

As shown in FIG. 4, the disclosure also provides circuit modules specifically implementing the solar power supply device. One implementing of the charge and discharge managing module is to switch on the relevant electronic switches and lock the relevant electronic interlocks according to different threshold voltage detections, to realize staged switching and locking, so as to achieve the charge and discharge with the hysteresis effect. Wherein, the charge and discharge managing module includes a voltage stabilizing circuit, a voltage sampling and control output circuit, an electronic interlock, a first electronic switch and a second electronic switch. Wherein, the solar panel charging power supply is connected to the voltage stabilizing circuit. The voltage stabilizing circuit is also connected in parallel with the energy storage element. The voltage sampling and control output circuit is connected to the electronic interlock. The voltage sampling and control output circuit is also connected to the energy storage element via the first electronic switch. The electronic interlock is also connected to the first electronic switch and the second electronic switch respectively.

In this embodiment, the solar panel charging power supply is a solar panel, and the energy storage element is a supercapacitor. Wherein, the solar panel 1 is connected to the voltage stabilizing circuit 2. The voltage stabilizing circuit 2 is also connected in parallel with the supercapacitor 3. The voltage sampling and control output circuit 4 is respectively connected with the electronic interlock 5 and a positive pole of the power output port. The voltage sampling and control output circuit 4 is also connected with the supercapacitor 3 via the first electronic switch 6. The electronic interlock 5 is also connected to the first electronic switch 6 and the second electronic switch 7 respectively. The second electronic switch 7 is also connected to a negative pole of the power output port.

The first electronic switch 6 and the second electronic switch 7 are normally open.

The solar panel 1 charges the supercapacitor 3 via the voltage stabilizing circuit 2 during the daytime. A switch-on signal is output to the first electronic switch 6 to switch on the first electronic switch 6 when the voltage sampling and control output circuit 4 detects that the voltage of the supercapacitor 3 is charged to the termination discharge voltage.

The supercapacitor continues to be charged. When the voltage across the supercapacitor reaches the initial discharge voltage, the voltage sampling and control output circuit 4 outputs a switch-on signal to the second electronic switch 7 and the electronic interlock 5, such that the second electronic switch 7 is switched on, the electronic interlock 5 is locked, and the power supply device starts to supply power to the powered equipment.

The maximum output voltage of the voltage stabilizing circuit 2 is the maximum voltage that the supercapacitor can be charged to, to ensure that the supercapacitor 3 is not overcharged.

After the powered equipment starts to work, the voltage of the supercapacitor 3 gradually decreases. Once the capacitor voltage is lower than the initial discharge voltage, the second electronic switch 7 continues to be switched on since the electronic interlock 5 is locked, and the circuit continues to supply power. When the voltage across the supercapacitor 3 is lower than the termination discharge voltage, the voltage sampling and control output circuit 4 outputs a switch-off signal, such that the first electronic switch 6 is switched off, and the electronic interlock 5 is unlocked to switch off the second electronic switch 7, and the power supply device stops supplying power to the powered equipment.

The functions of the solar power supply device are as follows:

1. Capacitor charging supervision and controlling function. Monitoring whether the capacitor voltage reaches the initial discharge threshold or the termination discharge threshold can limit the maximum voltage and prevent the capacitor from being overcharged, which is implemented by the functions of voltage stabilization and sampling in the function blocks of the voltage stabilizing circuit 2 and the voltage sampling and control output circuit 4 in FIG. 5.

2. State monitoring and controlling function for determining which state the supercapacitor is in. Under a same capacitor voltage, the pure charging state from a lower voltage or the power supply state dropped from the initial discharge voltage can be determined. Functions, such as output control, a primary switching-on, and a secondary locking, can be controlled by function blocks in FIG. 5, including the voltage sampling and control output circuit 4, the first electronic switch 6, the second electronic switch 7, and the electronic interlock 5, so as to realize the state management.

3. Discharge managing function. When the capacitor voltage reaches the initial threshold, the supercapacitor is started to discharge. When the capacitor voltage is lower than the termination discharge voltage, the discharging of the supercapacitor is terminated, and the output voltage of the power supply device drops to zero. The locking and unlocking of the electronic interlock 5, and the switch-on and switch-off of the first electronic switch 6 and the second electronic switch 7 in FIG. 5 are controlled to realize the opening and closing of the power output port.

The components realizing various functions of the disclosure are interacted and overlapped, ensuring that designed functions can be completed logically, and the implementation is simple and easy.

The embodiments in this specification are described in a progressive manner. Each embodiment focuses on the differences from other embodiments, and the same or similar parts between the various embodiments can be referred to each other.

Specific embodiments are adopted herein to illustrate the principles and implementations of the disclosure. The description of the above embodiments is only to help understanding the method and core idea of the disclosure. At the same time, according to the idea of the disclosure, there will be changes in a specific implementation and an application scope for those ordinary skill in the art. In summary, the content of this specification should not be construed as limiting the disclosure.

The invention claimed is:

1. An automatic control method for a solar supercapacitor power supply, comprising:
   obtaining a current state of a power supply device;
   obtaining a capacitor voltage of an energy storage element;
   in a case that the state of the power supply device is a pure charging state, if the capacitor voltage exceeds an initial discharge voltage, the power supply device switches to a power supply state and begins to discharge, such that an output port outputs a voltage; and if the capacitor voltage does not exceed the initial discharge voltage, the pure charging state is maintained and the power supply device continues to be charged, with a voltage of the output port being zero;
   in a case that the state of the power supply device has been switched to the power supply state, if the capacitor voltage is not lower than a termination discharge voltage, the power supply device maintains the power supply state; and if the capacitor voltage is lower than the termination discharge voltage, the power supply device is switched to the pure charging state with the voltage of the output port dropping to zero; and
   in the automatic control method for the solar supercapacitor power supply, the initial discharge voltage is higher than the termination discharge voltage, and a charge and discharge with hysteresis effect is achieved.

2. A solar power supply device, comprising: a solar panel, a supercapacitor, and a charge and discharge managing module; wherein
   the solar panel is configured to generate a current for charging the supercapacitor;
   the supercapacitor is configured to store power; when the power supply device is in a pure charging state, the supercapacitor stores the power generated by the solar panel, and the supercapacitor is not connected to an output port; when the power supply device is in a power supply state, the supercapacitor is connected to the output port to provide an original voltage for discharge, and able to be charged at the same time; and
   the charge and discharge managing module is connected to the solar panel and the supercapacitor, and the charge and discharge managing module is configured to achieve a capacitor charging supervision and controlling function, a state monitoring and controlling function and a discharge managing function, to manage two states comprising the pure charging state and the power supply state, and two power thresholds comprising the initial discharge voltage and the termination discharge voltage.

3. The solar power supply device of claim 2, wherein the charge and discharge managing module is configured to switch on a first electronic switch and a second electronic switch in a front end and a back end of a power supply path respectively by detecting a voltage from a low threshold to a high threshold; the charge and discharge managing module is further configured to lock an electronic interlock after the second electronic switch with the high-threshold is switched on, to ensure that when the second electronic switch is switched on in the power supply path, even if a voltage of an input port drops below the high threshold for switching on the second electronic switch but still higher than the low threshold for switching on the first electronic switch, the first electronic switch and the second electronic switch are maintained switched on; when the voltage of the input port is lower than the low threshold, the charge and discharge managing module is further configured to switch off the first electronic switch and the second electronic switch at the same time to disconnect the power supply path; thereby during the voltage drop of the supercapacitor, when a voltage of the supercapacitor is lower than the high threshold, the first electronic switch and the second electronic switch are not switched off; and when the voltage of the supercapacitor is lower than a low battery threshold, the first electronic switch and the second electronic switch are switched off together, to achieve staged switching and locking, in order to achieve a charge and discharge with hysteresis effect.

4. The solar power supply device of claim 2, wherein the supercapacitor can be replaced with a rechargeable battery.

5. The solar power supply device of claim 2, wherein the solar panel can be replaced with an environmental power supply, wherein the environmental power supply is a wind power supply, a temperature power supply, a vibration power supply, a sport power supply, a pressure power supply, an electromagnetic wave power supply, a water flow power supply or a human power supply.

6. The solar power supply device of claim 2, further comprising a control logic circuit, configured to control a maximum voltage of the supercapacitor to be charged and prevent the supercapacitor from being overcharged.

7. The solar power supply device of claim 2, wherein an output voltage of the output port decreases with a decrease of a remaining power of the supercapacitor, or is a stabilized voltage.

8. The solar power supply device of claim 6, further comprising an integration port, formed by directly integrating the control logic circuit and the output port into a front end of a powered equipment; wherein the integration port is externally connected to the solar panel and the supercapacitor, to achieve a solution that a solar panel charging power supply, the energy storage element, and a control module are physically separated and a logic power supply module actually keeps unchanged.

9. The solar power supply device of claim 2, further comprising a battery; when the power of the supercapacitor is lower than a low termination discharge voltage (amount), the supercapacitor is no longer discharged, the output port is converted to supply power by the battery or other power supplies, the supercapacitor turns into the pure charging state, and a powered equipment can still work, to ensure that a solar-charged supercapacitor is used by the power supply device first when there is sunlight, and the battery is started only when the supercapacitor has not been charged for a long time, to ensure that the equipment can work; when the power of the supercapacitor rises above an initial discharge threshold again, the battery is switched off from discharge, and the supercapacitor is started to discharge, entering a supercapacitor working state; in this way, a maximum utilization of the solar power supply device can be ensured, and the equipment can also be prevent from stopping working under extreme conditions.

* * * * *